United States Patent [19]
Hirama et al.

[11] Patent Number: 4,703,657
[45] Date of Patent: Nov. 3, 1987

[54] GAS PRESSURE SENSOR

[75] Inventors: Koichi Hirama; Yuji Miyazawa; Haruhiko Kotake, all of Kanagawa, Japan

[73] Assignee: Toyo Communication Equipment Co. Ltd, Kanagawa, Japan

[21] Appl. No.: 703,817

[22] Filed: Feb. 21, 1985

[51] Int. Cl.⁴ .......................... G01L 9/02; H01L 41/08
[52] U.S. Cl. ........................................ 73/702; 310/370
[58] Field of Search ...................... 73/702, 703, 32 A; 310/370, 349, 350

[56] References Cited
U.S. PATENT DOCUMENTS

| 3,902,355 | 9/1975 | Weisser | 73/702 |
| 4,498,344 | 2/1985 | Dinger | 73/702 |
| 4,509,970 | 5/1985 | Dinger | 73/702 |

Primary Examiner—Donald O. Woodiel
Attorney, Agent, or Firm—Handal & Morofsky

[57] ABSTRACT

A gas pressure sensor comprises a contour piezoelectric vibrator and the pressure of gas is detected by measuring an equivalent series resistance of the vibrator which is surrounded by the gas whose pressure is to be detected.

7 Claims, 18 Drawing Figures $\pm$ ··· upper face
$(\pm)$ ··· lower face

GAS PRESSURE SENSOR

BACKGROUND OF THE INVENTION

1. Field of the Invention

The present invention relates to a gas pressure sensor utilizing a piezoelectric vibrator.

2. Description of the Prior Art.

A pressure sensor for detecting gas pressure is known in which a gas pressure is detected from changes in vibration frequency of a piezoelectric vibrator based on micro-deformation to be produced when a gas pressure is brought to act on the piezoelectric vibrator, typically of crystal, by way of a converter such as a diaphram for converting the pressure to a displacement.

However, prior art pressure sensors such as mentioned above have drawbacks in that their construction is complicated due to the necessity of the pressure-to-displacement converter and thus the pressure detection tends to be affected by external vibrations or shocks. In addition, both sensitivity and resolution of detection have not been very high.

SUMMARY OF THE INVENTION

The object of the present invention is to eliminate the aforementioned drawbacks of the prior art pressure sensor which utilizes the piezoelectric vibrator and to provide a pressure sensor wherein a gas pressure is applied to a contour piezoelectric vibrator directly or through a sealed gas and series equivalent resistance of the vibrator is detected.

In one modification of the present invention, exciting electrodes are arranged with a predetermined distance spaced from corresponding surfaces of a contour piezoelectric vibrator to increase the Q value of the vibrator so that gas pressure can effectively be measured in a range of high degree of vacuum.

DETAILED DESCRIPTION OF THE PREFERRED EMBODIMENT

The present invention will now be described in detail with reference to the drawings showing embodiments employing a tuning fork type crystal vibrator and an X cut crystal vibrator.

Figure 1A:
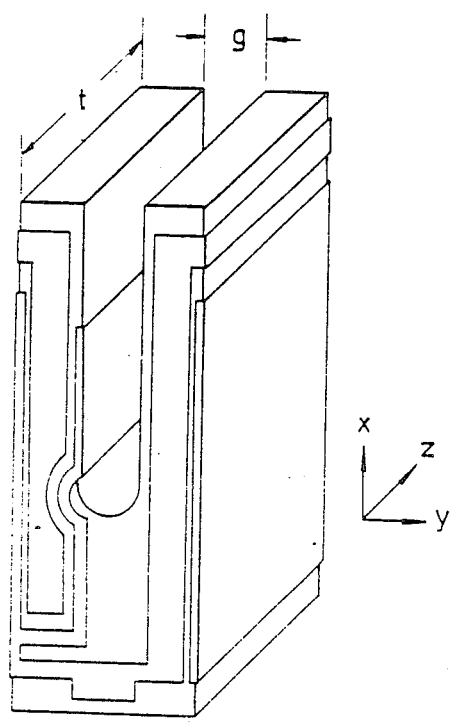
FIG. 1 (a) is a perspective view of tuning fork type piezoelectric vibrator to be used for the pressure sensor of the present invention and (b) is a schematic plan view showing the manner of applying an electric field to the electrodes.
Figure 1B:
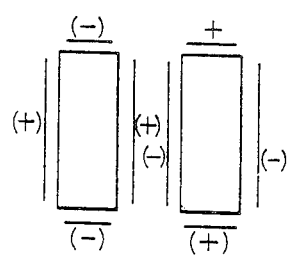
Figure 2:
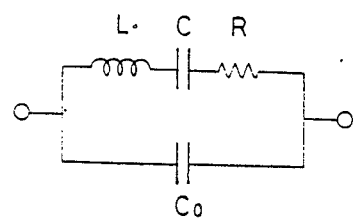
FIG. 2 shows an equivalent circuit of the piezoelectric vibrator shown in FIG. 1.

FIG. 1 shows a typical X cut tuning fork type crystal vibrator, in which it is assumed that the tuning fork space (the space between the fingers of the tuning fork) is g and plate thickness is t. These parameters g and t are factors determining characteristics of the vibrator. FIG. 2 shows an electric equivalent circuit of the vibrator.

In such a vibrator, the equivalent circuit parameters L, C, R, $C_o$ shown in FIG. 2 vary according to the pressure of surrounding atmosphere. This phenomenon has been known as so-called "air loading", and how the variation in frequency change due to the air loading can be reduced has been an important subject in designing and manufacturing of vibrators.

The pressure sensor of the present invention is directed to positively utilizing the variation of the equivalent series resistance R due to air loading.

Figure 3:
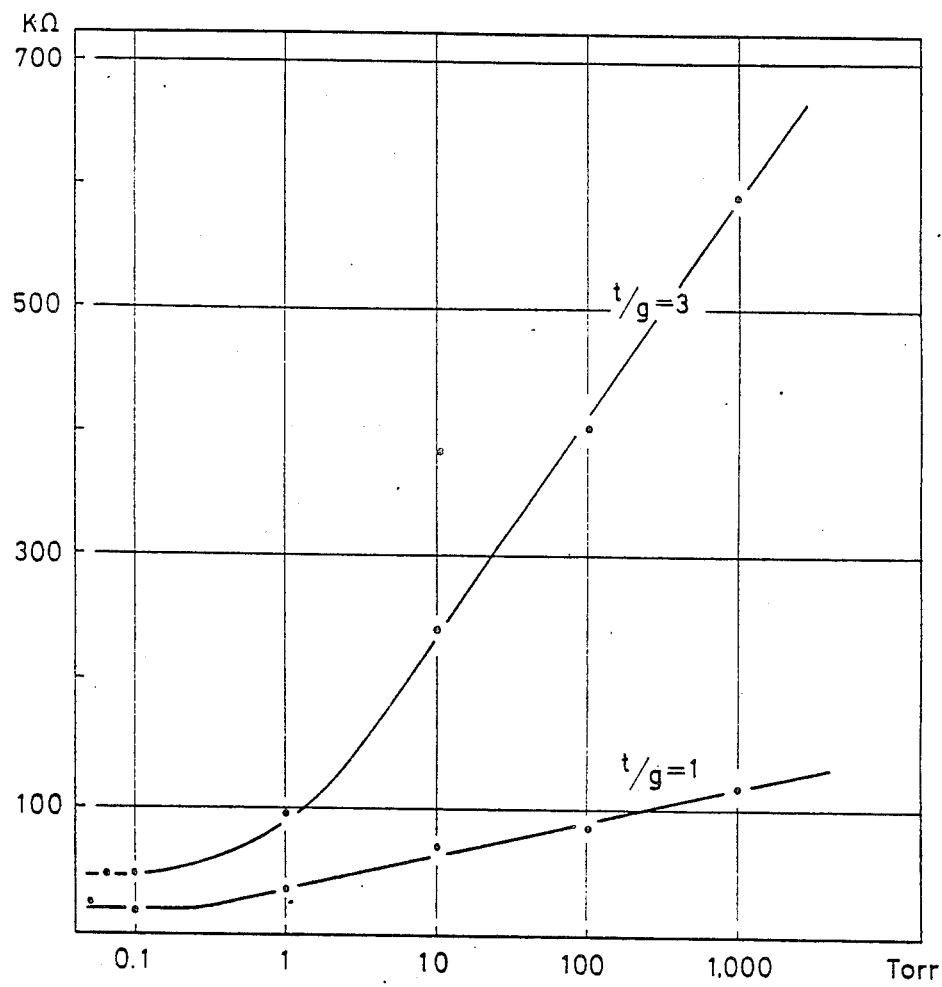
FIG. 3 is a graph showing the relationship between the gas pressure around the vibrator and the series equivalent resistance of the vibrator.

FIG. 3 is a plotted graph plotted based on the measurement of the relationship between air pressure and the equivalent series resistance R of two tuning fork crystal vibrators which are represented by the ratio of the tuning fork space g and the plate thickness t. The electrode shape is similar in these two crystal vibrators as shown in FIG. 1, and generally adopted shape is used. As seen from FIG. 3, pressures over the range from about 1 Torr to several thousand Torr can be measured with the pressure sensor of this type. When $t/g=3$, the change in the equivalent series resistance with respect to the pressure change is several times larger than when $t/g=1$. Since, in either case, the equivalent series resistance is substantially proportional to the logarithm of the pressure value in a high gas pressure region, the pressure sensor of the present invention is suitable to wide range pressure measurement.

The viscosity coefficient of a gas generally becomes smaller as temperature rises in proportion to the square root of the absolute temperature. And since it is known that the series equivalent resistance of the tuning fork type piezoelectric vibrator is in direct proportion to the viscosity coefficient of the gas, it is necessary to maintain the temperature of the gas acting directly on the tuning fork type piezoelectric vibrator constant or to provide a temperature compensation means. Further, when measuring gas pressure with the pressure sensor utilizing the tuning fork type piezoelectric vibrator of the present invention, it is also necessary to eliminate effects of vibrator aging, condensation, temperature change, etc.

Figure 4:
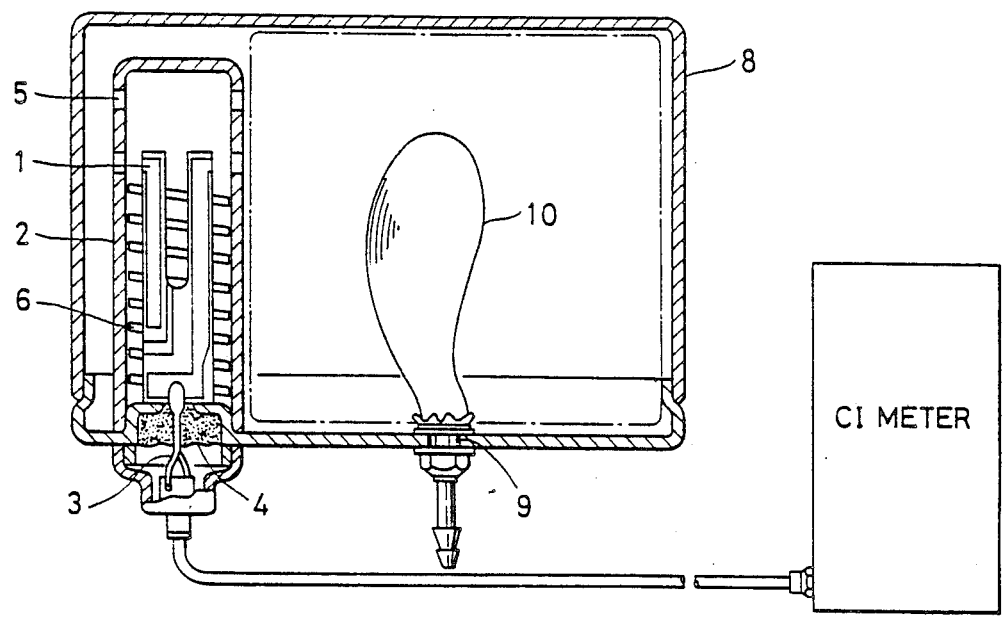
FIG. 4 is a sectional view showing the construction of an embodiment of a pressure sensing unit of the present invention.

FIG. 4 is a sectional view of an example of the gas pressure sensor of the present invention, in which a tuning fork type piezoelectric vibrator 1 is secured to a sealing tube 2, such as a vibrator case for use in clocks, at its bottom, and a lead wire 3 is drawn out therefrom via an insulating glass 4 insulating the lead wire 3 electrically from the sealing tube.

In the tube wall of the sealing tube 2 are provided a plurality of gas flow through holes 5. Further, a heating wire 6 is printed on the tube wall, and its lead wire is drawn out through the insulating glass 4. The sealing tube 2 securing the piezoelectric vibrator as mentioned above is securely disposed at a corner of an outer case 8 of a suitable size. In the outer case 8, a rubber elastic balloon-like bellows 10 is provided at a hole 9 formed at a suitable location of the wall surface of the outer case 8, and outside air or a gas whose pressure is to be measured is caused to flow through the hole 9 to and from the bellows 10. Further, inactive gas, such as nitrogen gas, is sealed into the case 8 so that the vibrator 1 vibrates in the inactive gas.

With the above-described construction of the pressure sensor, the bellows 10 can freely inflate in the case 8. As a result, when a gas whose pressure is to be measured flows into the bellows 10, the bellows 10 becomes stable when the internal pressure P of the bellows 10 becomes equal to the internal pressure P' of the pressure sensor case 8, and therefore the pressure value can be obtained by measuring the series equivalent resistance of the vibrator 1 in the stable condition with, say, a CI meter and by referring to the conversion graph shown in FIG. 3.

Since the vibrator 1 is secured in the sealing tube 2, the bellows 10 does not touch the vibrator 1, enabling the unhindered vibration of the vibrator 2. In addition, since atmosphere around the sealing tube 2 is heated at a constant temperature by the heating wire 6, and since the heat exchange between the atmosphere around the sealing tube 2 and the gas whose pressure is to be measured is performed through the inactive sealed gas in the sensor case 8 and the bellows 10, the temperature variation of the atmosphere around the tube 2 is very small. Accordingly, the vibrator 1 is substantially kept at a constant temperature, enabling high and stable measuring accuracy.

Figure 5:
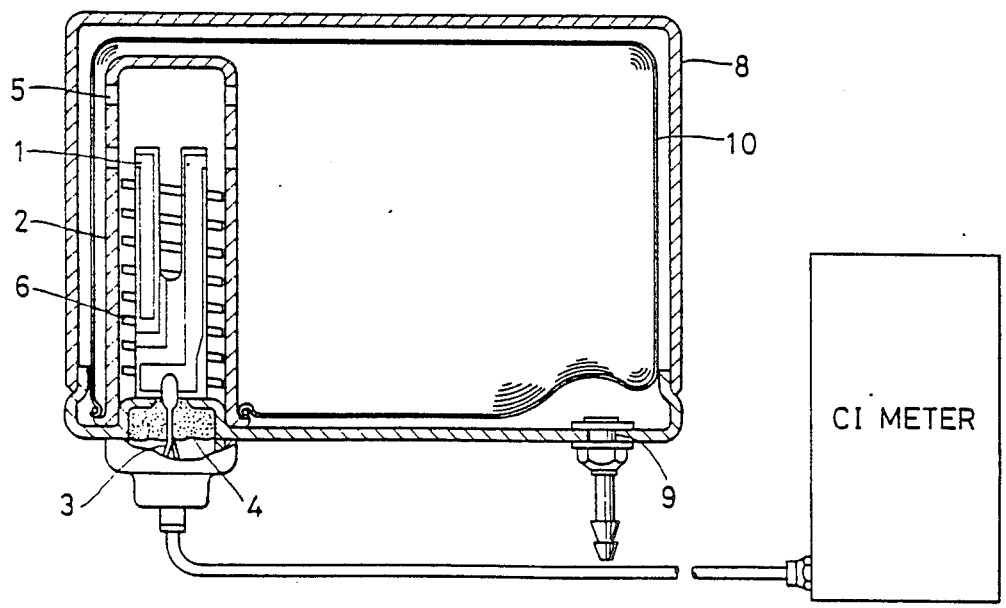
FIG. 5 is a sectional view of another embodiment of the pressure sensing unit.

FIG. 5 is a sectional view showing another example of the gas pressure sensor in which the same effect can be obtained as that of the above-described construction, by devising such that the gas whose pressure is to be measured is directed into the sensor case 8 directly and both the vibrator 1 and the sealing tube 2 are accommodated in the bellows 10.

With the structures as have been described heretofore, in connection with the two embodiments, the pressure sensor of the present invention can measure gas pressures at a very high resolution and accuracy with ease, and the sensor size can be reduced to sufficiently small by selecting the materials of the bellows having an adequate elastic modulus, hence making a gas pressure sensor suitable for altimeters, speedometers up to around subsonic speeds, gas flowmeter, or the like.

Of course, for the pressure sensor of the present invention, the vibrator is not limited to the tuning fork type vibrator, but other vibrators making contour vibration may be used. In such case, a node supporting method unique to the particular vibrator to be used should be devised as will be described later.

In the aforementioned embodiment, the range in which the value of the series equivalent resistance remarkably varies with respect to the gas pressure extends only down to the about 1 Torr. Thus, the gas pressure cannot be measured in the high vacuum region with the gas pressure of less than 1 Torr because the variation of the series equivalent resistance with respect to the pressure reaches is in a saturation state as seen in FIG. 3.

Figure 6A:
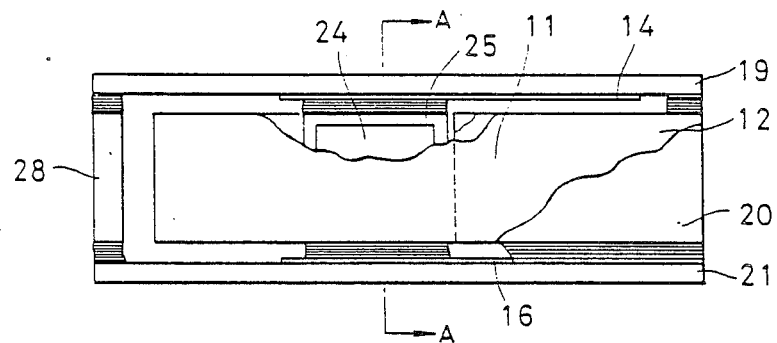
FIG. 6 shows another embodiment of a vibrator of the gas pressure sensor according to the present invention in which exciting electrodes are provided with a predetermined distance from a vibrator substrate, wherein (a) is an elevational view, parts being broken away, (b) is a sectional view taken along lines A—A in (a) and (c) is a plan view, a part being broken away.
Figure 6B:
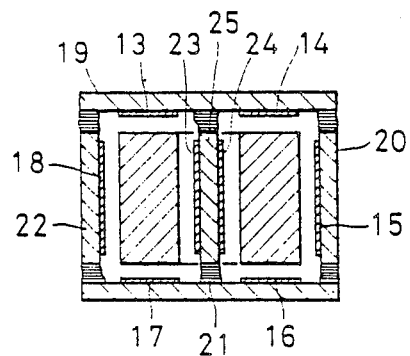
Figure 6C:
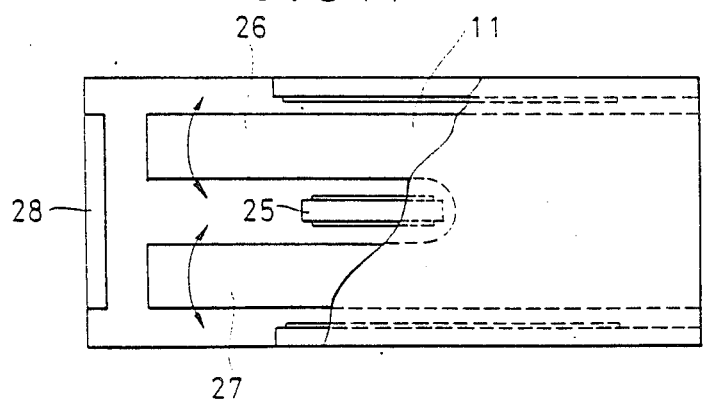

FIGS. 6(a), (b) and (c) show another embodiment in which the exciting electrodes are provided with a predetermined distance from a tuning fork type crystal vibrator substrate.

In the drawing, a base 12 of a tuning fork type crystal vibrator substrate 11 is fixedly surrounded at its four sides by crystal substrates 19 to 22 to which attached are electrodes 13 to 18 respectively. A crystal substrate 25 having electrodes 23 and 24 attached at its both sides is fixedly provided between fingers 26 and 27 of the tuning fork type crystal substrate 11. The electrodes-attached substrates 19 to 22 are fixed at the free end side of the tuning fork fingers to a crystal substrate 28.

In such an electrodes-spaced tuning fork type vibrator as arranged above, there is a possibility that the bending vibration of the tuning fork fingers 26 and 27 may be interfered with the electrodes-attached crystal substrate 25 inserted between these fingers on the electrode-attached substrates 20 and 22. However, in the vibrator substrate 11 the maximum distortion caused by the bending vibration of the fork fingers, i.e., the maximum level of electric charge generated, takes places in the vicinity of the joint portion of the both fingers. Therefore, this interference can be removed by providing the electrodes-attached crystal substrates 25 as well as 20 and 22 only in the vicinity of the joint portion while avoiding its extension to the vicinity of the free ends of the both fingers where large vibration displacement takes place.

Figure 7:
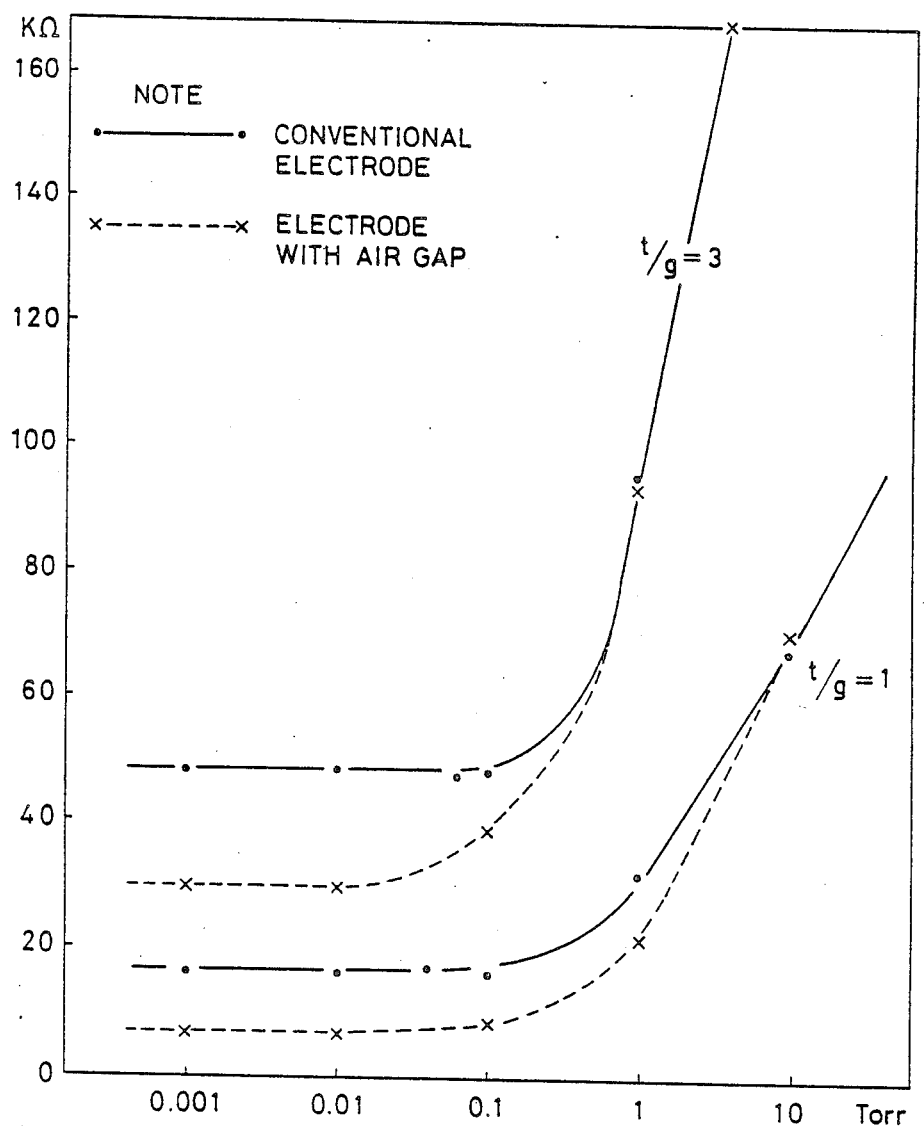
FIG. 7 is a graph showing experimental results of the gas pressure sensor of electrodes-shaped tuning fork type and electrodes-attached type.

FIG. 7 shows the experimental results of the gas pressure sensor of electrodes-spaced tuning fork type arranged as above with a conventional type gas pressure sensor of electrodes-attached tuning fork type. In the drawing, there is no difference between the both sensors in the high pressure region and thus the drawing shows only the high vacuum region.

It will be seen from the drawing that for both cases where t/g is 1 and 3, the pressure range in which the series equivalent resistance varies greatly is expanded in the electrodes-spaced type about 10 to $10^2$ Torr wider to the high vacuum side than that in the conventional type. This is interpreted that an increase in the Q-value of the vibrator resulting from the electrode spacing arrangement allows the sensor to detect a slight loss due to energy propagation into an atmosphere especially into a high vacuum atmosphere. Therefore, when such a gas pressure sensor as mentioned above is used, the degree of vacuum can be measured up to about $10^{-2}$ to $10^{-3}$ Torr highly easily and accurately.

Although the tuning fork type vibrator has been used as a piezoelectric vibrator in the aforementioned embodiment, the present invention is not limited to this particular type and a vibrator of any other type may be employed.

Figure 8:
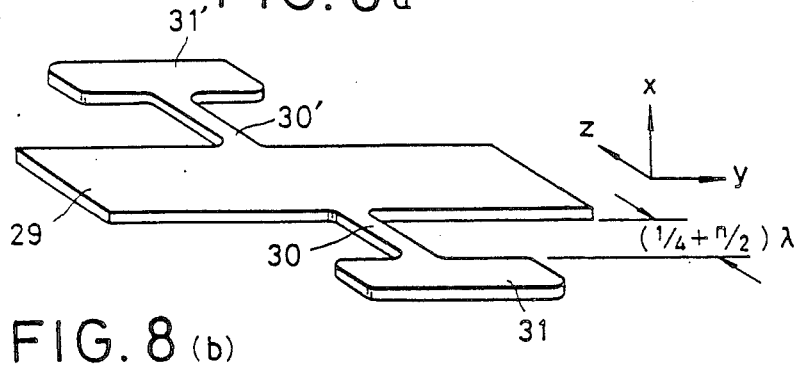
FIG. 8 shows a further embodiment of the gas pressure sensor according to the present invention which employs an X cut strip type crystal vibrator exhibiting a longitudinal vibration mode, wherein (a) is a perspective view of the vibrator substrate, (b) is an elevational view of the vibrator, parts being taken away, (c) is a sectional view taken along lines B—B in (b), (d) is a plan view of the vibrator, parts being broken away.
Figure 8:
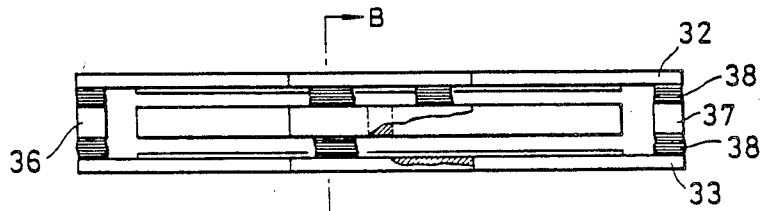
Figure 8:
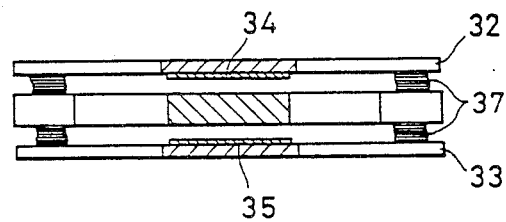
Figure 8:
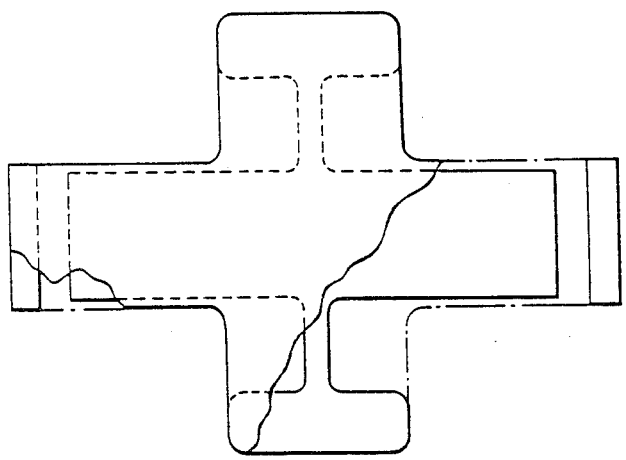

FIGS. 8(a), (b), (c) and (d) show a further embodiment of the gas pressure sensor in accordance with the present invention which employs an X cut strip type crystal vibrator exhibiting a longitudinal vibration mode.

More specifically when an X cut bar type crystal substrate 29 exhibiting a longitudinal vibration mode is used, as shown in FIG. 8(a), arms 30 and 30' each having a length of $(\frac{1}{4}+n/2)\lambda$ (where $\lambda$ is a standing wavelength on the arm) are extended from the central portion (which forms nodes of the longitudinal vibration) both side edges of the substrate 1 in the Z axis directions. The arms 30, 30' are integrally attached at their tip ends with holding plates 31 and 31' for example, by the etching technique. Such an arrangement enables to reduce the vibration energy loss resulting from the mounting of these arms at the nodes of the substrate 28 and to prevent the reduction in the Q value of the vibrator.

Crystal substrates 32 and 33 are prepared which have the same cut as the X cut crystal vibrator substrate 29 and can cover the substrate 29. Exciting electrodes 34 and 35 are attached onto respective one surfaces of the substrates 32 and 33, by such a technique as evaporation, such that the electrode-attached surfaces of the substrates 32 and 33 will face the face and back main surfaces of the crystal vibrator substrate 29 with a predetermined gap therebetween.

In this connection, in order to ensure the mutually parallel relation between these three substrates 29, 32 and 33, it is preferable that the length of the holding plates 31 and 31' in the Y axis direction is maximized and crystal blocks 36 and 37 are inserted and fixed between the substrates 32 and 33 at their both ends of the longitudinal (Y axis) direction.

Mutual adhesion between these crystal substrates can be achieved by applying aluminum-silver-indium or chromium-chrome gold-gold on the adhesive surfaces of the crystals to form an adhesive layer 38 and then applying a proper intensity of heat while applying a pressure thereto. A spacing between the surface of the crystal vibrator substrate 29 and the exciting electrodes 34 and 35 can be freely selected to be between 0.5 and several um by adjusting the thickness of the adhesive layer 38. When a $-18.5$ X cut crystal substrate is used, its vibration wave surface becomes parallel to a surface made by the both ends of the substrate in the longitudinal (Y' axis) direction so that the disturbance of reflected waves can be reduced and thus the Q-value can be increased.

Explanation has so far been made as to the structure of the sensor using the X cut crystal substrate in the foregoing, but the similar method can be applied to other contour vibrators. For example, the present invention is applied in exactly the same manner to CT, DT, SL and HT cut crystal substrates exhibiting a contour shear vibration mode.

Figure 9A:
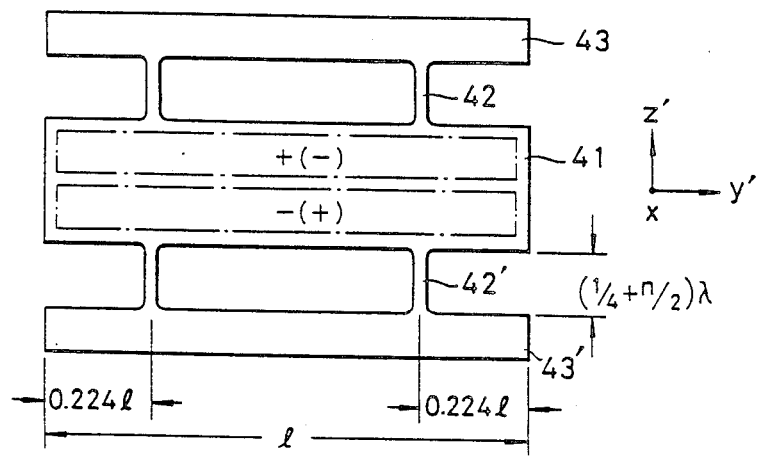
FIG. 9 shows an X cut crystal vibrator having a flexure mode in YZ plane, wherein (a) is a plan view of a vibrator substrate and (b) is a side view of the vibrator.
Figure 9B:
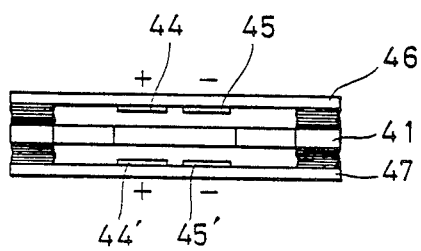

FIG. 9 shows an X cut crystal vibrator having a flexure mode in the YZ plane. In FIG. 9 (a) arms 42, 42' having a length of $(\frac{1}{4}+n/2)\lambda$ extend from the points in the longitudinal (Y'-axis direction) sides of a crystal substrate where vibration nodes are located, that is, 0.224 l from the ends of the substrate whose length is l. At the tips of the arms 42, 42' provided are holding plates 43, 43'. As shown in FIG. 9(b), divided electrodes 44, 44' and 45, 45' are provided on substrates 46 and 47 such that the electrodes 44 and 45 are faced with the crystal vibrator substrate 41 in the longitudinal direction with a predetermined spacing therebetween. To the divided electrodes 44, 44' and 45, 45', an alternating electric field is applied in such a manner that the phase of the electric field is reversed both in the same face and in the opposing face as shown in FIG. 9 (b). For an NT cut crystal vibrator, same construction of vibrator can be adapted.

Figure 10A:
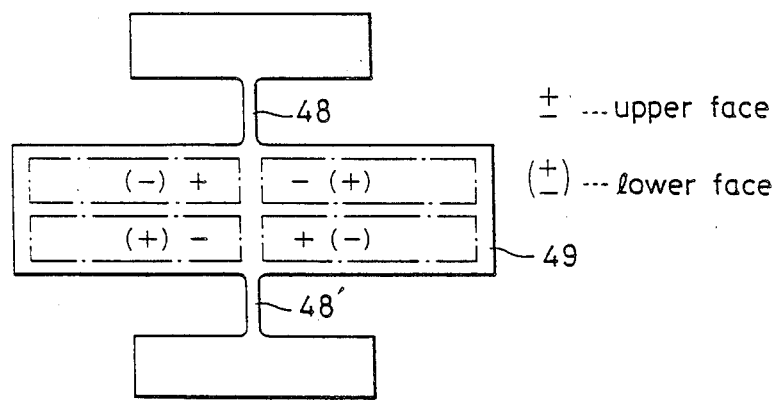
FIG. 10 shows the vibrator of FIG. 9 which is utilized as a vibrator of second flexure mode in plane, wherein (a) is a plan view of a vibrator substrate and (b) show electrode arrangement on electrode attached substrate.
Figure 10B:
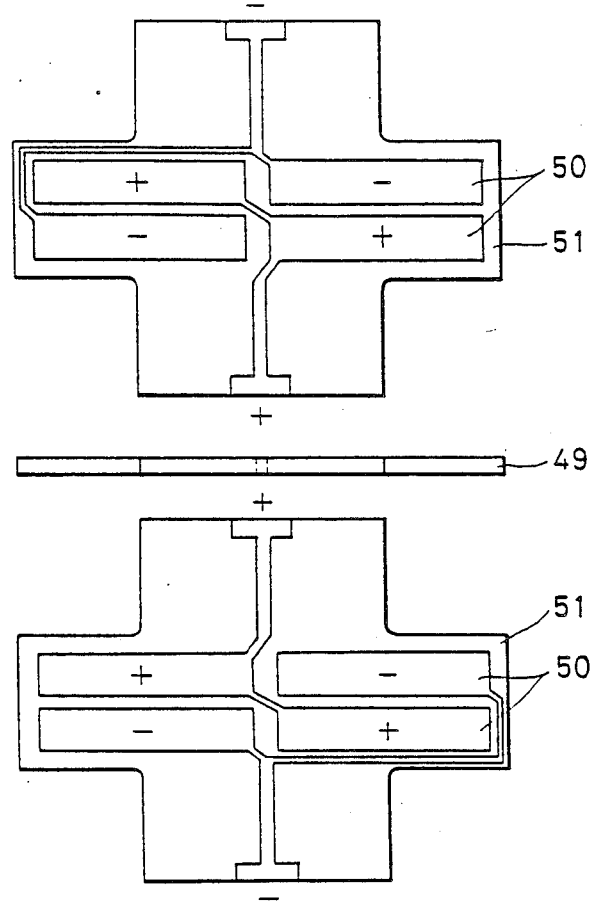

When the vibrator shown in FIG. 9 is utilized as a vibrator of second flexure mode in plane, the displacement and stress caused by the vibration are zero at the central portion of the crystal substrate in the longitudinal direction. Accordingly, a pair of arms 48, 48' are provided at the center of both longitudinal sides of the crystal substrate 49 to support the substrate as shown in FIG. 10 (a). The construction of electrodes and the manner in which electric field is applied to the electrodes are also shown in FIG. 10 (a).

FIG. 10 (b) shows the construction of the electrode with a spacing from the vibrator substrate in which electrodes 50 divided into four parts are attached onto two electrode attaching substrate 51. These electrodes 50 are so connected by connecting patterns shown in the drawing that the phases of an electric field applied to the vibrator are reversed to each other both in the same plane and the opposing plane and electricity is supplied from the both end of the substrate.

As for GT cut vibrator, vibrator substrate can be supported at opposing edges by means of a cushion and holding members.

Although explanation has been made as to the gas pressure sensor utilizing the crystal substrate alone in the foregoing, the present invention is not restricted to this particular crystal material but other piezoelectric materials or non-piezoelectric material substrates attached with piezoelectric materials can be employed.

What is claimed is:

1. A gas pressure sensor, comprising a contour piezoelectric vibrator, gas surrounding said vibrator, means for communicating pressure to said gas surrounding said contour piezoelectric vibrator, exciting electrodes for applying an electric field to said vibrator, and means for detecting within said pressurized environment an equivalent series resistance of said vibrator to obtain a signal which varies in response to pressure.

2. A gas pressure sensor as set forth in claim 1 wherein said vibrator has a Q value and said exciting electrodes of said vibrator are spaced apart by a predetermined distance from corresponding surfaces of a piezoelectric substrate forming said vibrator to improve the Q-value of the vibrator and allow measurement of a wide range of gas pressures.

3. A gas pressure sensor as set forth in claim 2 wherein said exciting electrodes are attached onto surfaces of substrates made of the same material as said piezoelectric substrate forming said piezoelectric vibrator, and said electrodes-attached substrates are fixed to the piezoelectric substrate forming the piezoelectric vibrator with a predetermined spacing distance.

4. A gas pressure sensor as set forth in claim 1 wherein said vibrator is of the tuning fork type and a ratio t/g of a plate thickness t to a spacing g between tuning fork fingers is selected to determine a sensitivity of said sensor.

5. A gas pressure sensor as set forth in claim 1 wherein said gas surrounding said piezoelectric vibrator is an inert gas and said vibrator is sealed together with bellows means for receiving a gas whose pressure is to be measured.

6. A gas pressure sensor as set forth in claim 1 wherein said piezoelectric vibrator is sealed within bellows means together with an inert gas, and said gas whose pressure is to be measured acts on said bellows means.

7. A gas pressure sensor, comprising a contour piezoelectric vibrator, gas surrounding said vibrator, exciting electrodes for applying an electric field to said vibrator, and means for detecting pressure within said pressurized environment, wherein pressure of said gas surrounding said contour piezoelectric vibrator is detected by measuring an equivalent series resistance of said vibrator to obtain a signal which varies in response to pressure.

* * * * *